(12) United States Patent
Bierer et al.

(10) Patent No.: US 8,706,613 B2
(45) Date of Patent: Apr. 22, 2014

(54) SYSTEM AND METHOD FOR AN EMERGENCY RESERVE DURING A COVERED EVENT USING ACTUARIAL DATA

(75) Inventors: Jeffrey H. Bierer, Charlotte, NC (US); Andrew Kramer, Charlotte, NC (US); Robert M. Mauldin, Charlotte, NC (US); Thomas Myrick, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1220 days.

(21) Appl. No.: 11/839,066

(22) Filed: Aug. 15, 2007

(65) Prior Publication Data
US 2009/0048972 A1   Feb. 19, 2009

(51) Int. Cl.
*G06Q 40/00*   (2012.01)

(52) U.S. Cl.
USPC .......................................................... 705/38

(58) Field of Classification Search
CPC ..... G06Q 40/00; G06Q 40/08; G06Q 40/025; G06Q 40/02
USPC .................................................... 705/35–45
See application file for complete search history.

(56) References Cited

U.S. PATENT DOCUMENTS

| | | | |
|---|---|---|---|
| 6,332,125 B1 * | 12/2001 | Callen et al. ...................... 705/4 |
| 6,944,597 B2 * | 9/2005 | Callen et al. ...................... 705/4 |
| 7,182,253 B1 * | 2/2007 | Long .............................. 235/379 |
| 7,533,803 B2 * | 5/2009 | Long, Sr. ...................... 235/379 |
| 7,941,355 B1 * | 5/2011 | DeLoach ......................... 705/35 |
| 8,229,843 B2 * | 7/2012 | Breslin et al. ................... 705/38 |
| 8,255,301 B1 * | 8/2012 | Willin et al. .................... 705/35 |
| 8,447,670 B1 * | 5/2013 | DeLoach ......................... 705/35 |
| 8,447,672 B2 * | 5/2013 | DeLoach ......................... 705/35 |
| 8,473,395 B1 * | 6/2013 | DeLoach ......................... 705/35 |
| 2002/0091553 A1 * | 7/2002 | Callen et al. ...................... 705/4 |
| 2002/0198801 A1 * | 12/2002 | Dixon et al. ..................... 705/35 |
| 2003/0009358 A1 * | 1/2003 | Greenfeld et al. ................. 705/4 |
| 2003/0155416 A1 | 8/2003 | Macklin et al. |
| 2005/0125259 A1 * | 6/2005 | Annappindi ...................... 705/4 |
| 2005/0216315 A1 | 9/2005 | Andersson |
| 2005/0228749 A1 | 10/2005 | Lozano |
| 2006/0106640 A1 * | 5/2006 | Deline ............................. 705/2 |
| 2008/0183636 A1 * | 7/2008 | Walsh et al. ................. 705/36 R |

OTHER PUBLICATIONS

UC Davis Policy and Procedure Manual: Section 380-56 Employee Emergency Loan Fund, Nov. 18, 2005.*

(Continued)

*Primary Examiner* — Mohammad Z Shaikh
(74) *Attorney, Agent, or Firm* — Michael A. Springs; Moore & Van Allen PLLC; James C. Edwards

(57) ABSTRACT

A system and method for providing emergency conditional credit to a customer of a financial institution. The system includes a customer site and a financial institution. The financial institution determines actuarial data using past history of customers incurring specified events, the actuarial data useable to predict future specified events, determines a cost for offering an emergency reserve (ER) product using the actuarial data, determines a qualification standard for the ER product, and offers the ER product to a person at the customer site. An emergency reserve protection (ERP) feature that provides protection that cancels any ER balance on a monthly basis during a covered event may also be offered to customers. One or more vendor sites may be used to handle some of the processing or managing of the ER and ERP product offerings.

27 Claims, 13 Drawing Sheets

(56) References Cited

OTHER PUBLICATIONS

UC Davis: Employee Emergency Loan Fund: Accounting Manual (Dec. 31, 2003; pp. 1-8).*
Hale, S, "Orlando, Fla, Businesses Still Hurting from Terrorist Attacks", Knight Ridder Tribune News, Nov. 8, 2002, pp. 1-1.*
Simon, Emma, "Give yourself a break, protect your income If you plan to buy insurance to protect your income in the event of illness, choose carefully: some policies are better than others, says Emma Simon", Sunday Telegraph (United Kingdom), Jul. 1, 2007, p. 017.*
Mayer, Caroline E, Lenders Peddle Protection, at a Hefty Profit; Debt Coverage Unregulated and Pricey for Consumers: [Final Edition], The Washington Post [Washington, D.C], Mar. 13, 2004, pp. 1-3.*
"Rep. Melancon, Congressional Leadership Discuss Progress of Katrina/Rita Hurricane Recovery Legislation", US Fed News Service, Including US State News [Washington, D.C], Mar. 29, 2007, pp. 1-6.*
UC Davis Policy and Procedure Manual: Section 380-56 Employee Emergency Loan Fund, Sep. 22, 2006, pp. 1-2.*
UC Davis: Employee Emergency Loan Fund: Accounting Manual, Dec. 31, 2003; pp. 1-8.*
Diekmann, Frank J, "Pink Slip? Product Offers Some Relief", Credit Union Journal, 6.40, Oct. 7, 2002, p. 10.*
Panko, Ron, "Resuscitating Credit Life", Best's Review, 103.9, (Jan. 2003), pp. 62-66.*
Reilley, Bob, "Debt Cancellation: the preferred alternative to credit insurance", ABA Banking Journal's White Paper, Oct. 2001, pp. 1-6.*
International Search Report, corresponding to International Patent Application No. PCT/US2008/73277, dated Jun. 8, 2009.
Written Opinion, corresponding to International Patent Application No. PCT/US2008/73277, dated Jun. 8, 2009.
International Preliminary Report on Patentability mailed Feb. 25, 2010 for International Application No. PCT/US2008/073277.

* cited by examiner

SYSTEM AND METHOD FOR AN EMERGENCY RESERVE DURING A COVERED EVENT USING ACTUARIAL DATA

BACKGROUND

Embodiments of the present invention relate to providing emergency cash to a customer, and more specifically to providing a conditional emergency reserve to a customer based on actuarial information.

Emergency situations related to loss of income put many people in situations that they are not ready for. A very large percentage of the American population lacks the appropriate resources to deal with an interruption in income. Many within this population do have access to credit, but in many cases that credit is maxed out. A significant portion of that overall subset falls into the Low-FICO/Thin Credit File/No Hit File category which has even fewer reputable, easy to access, non-usurious options for obtaining credit. Many banks' own credit underwriting standards exclude a very large portion of its own population. These banks are only able to extend a pre-approved credit offer to a small percentage of new Checking Account applicants.

The inability of many people to handle loss of income has been widely published. For example: "[a] one week delay (in pay) would cause 40% of American workers to cut back on critical payments, including rent, mortgage, credit card and utility bills" (Source: ADP Payroll Services Survey); "[n] early one-quarter (22 percent) of U.S. respondents said that once they have covered their basic living expenses, they have no money left over" (Source: ACNielsen Online Consumer Confidence Survey, September 2006); and also almost one-half of all U.S. adults (45%) say their household does not have enough money in liquid savings to cover at least 3 months of living expenses (Source: Harris Interactive nationwide survey of 2,328 adults, February 2006). Most recently a GFK Roper survey of Americans' emergency savings commissioned by Brankrate reported that 54% do not have an emergency savings fund established (Source: Brankrate.com, Jul. 23, 2007).

Customers who do not currently have enough in savings to cover themselves and their families during a period of income interruption are, for the most part, faced with the following options:

TABLE 1

Source: Center for Responsible Lending

| Option | Average APR | Availability |
| --- | --- | --- |
| Family | NA | Dependent on a number of factors, but in most cases family is not a viable option |
| Unsecured Loans | ≥30% | Limited to those who have a good credit history and proven means of repayment |
| Pay Day Lending | 300%-500% | Current employment required |
| Title Loans | 200%-400% | Must be sole owner of the vehicle |
| Pawn Shops | 100%-200% | availability limited only by the amount of pawnable goods the customer owns |
| Credit Cards | ≥34% | Limited to those who have good credit and available credit |

SUMMARY

Embodiments of the present invention relate a method for providing emergency conditional credit that may include: determining actuarial data using past history of customers incurring loss of income events such as involuntary unemployment, disability or hospitalization, the actuarial data useable to predict future emergency cash needs; determining a cost for offering an emergency reserve (ER) product using the actuarial data; determining a qualification standard for the ER product; and offering the ER product to people, where the ER product disburses a specific cash payment amount to a customer over a specific period of time, for at least one covered event.

Moreover, embodiments of the present invention relate to a system for providing emergency conditional credit that includes: a customer site, the customer site having at least one of a workstation capable of receiving and transmitting information electronically or mail handling capable of receiving and sending information by mail; and a financial institution site, the financial institution site having a workstation capable of receiving and transmitting information electronically and mail handling capable of receiving and sending information by mail, where the financial institution determines actuarial data using past history of customers requiring emergency cash, the actuarial data useable to predict future events, determines a cost for offering an emergency reserve (ER) product using the actuarial data, determines a qualification standard for the ER product, and offers the ER product to a person at the customer site.

Further, embodiments of the present invention relate to an article, the article comprising a storage medium with instructions stored therein, the instructions when executed causing a processing device to perform: determining actuarial data using past history of customers incurring loss of income events such as involuntary unemployment, disability or hospitalization, the actuarial data useable to predict future emergency cash requirements; determining a cost for offering an emergency reserve (ER) product using the actuarial data; determining a qualification standard for the ER product; and offering the ER product to people, wherein the ER product provides a specific cash payment amount to a customer over a specific period of time, the customer being eligible for the cash payment if the customer has previously purchased the ER product, has requested the cash payment for an entered event, and the event is a covered event.

In addition, embodiments of the present invention relate to offering an optional emergency reserve protection (ERP) feature (also known as debt cancellation) to customers, the optional ERP feature providing protection that cancels any ER balance on a monthly basis during a covered event.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
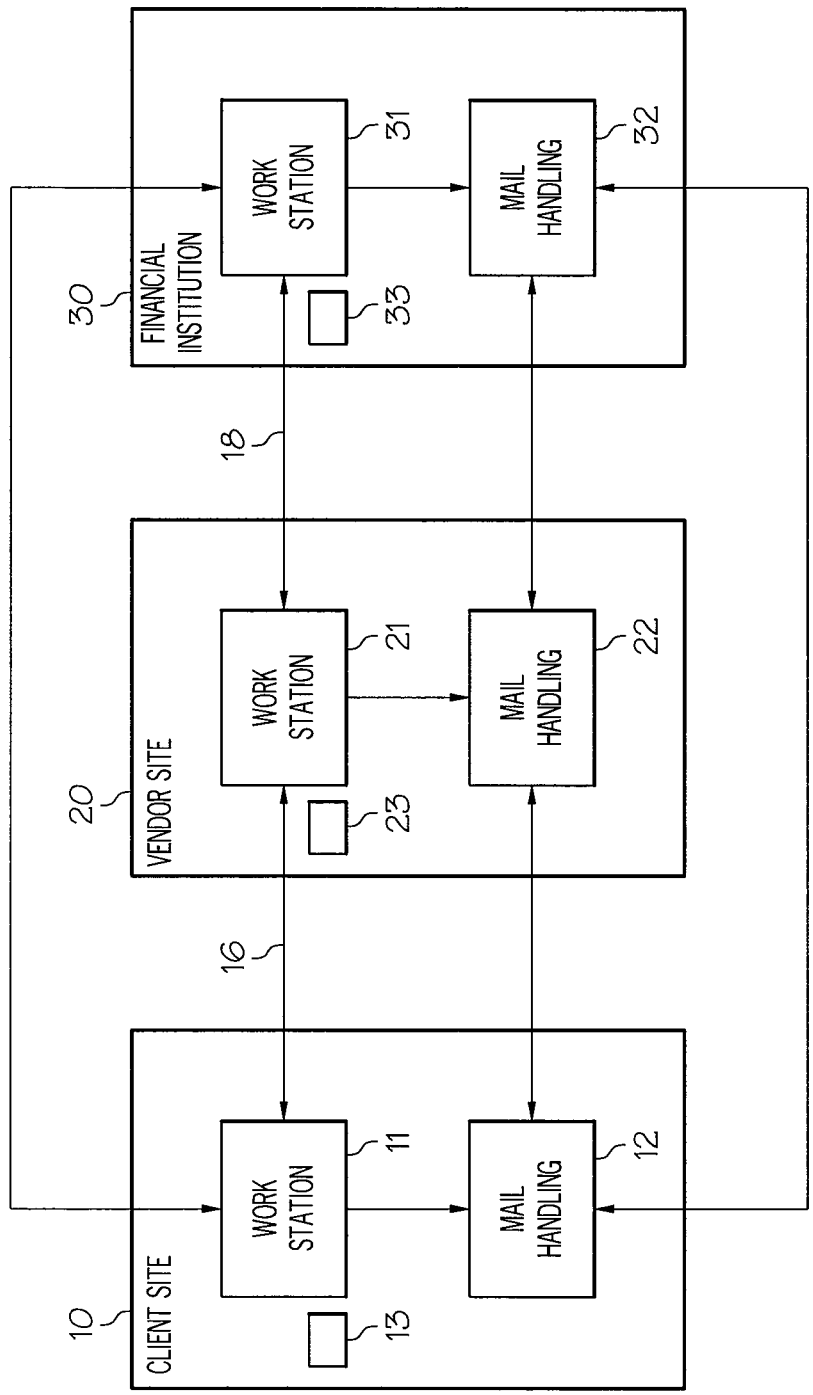
FIG. 1 is a system for providing emergency conditional credit according to an example embodiment of the present invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to an Emergency Reserve (ER) that is a conditional credit that can be accessed only during a covered event. Covered events may be determined by a particular financial institution. For illustrative purposes, embodiments of the present invention will be described where the covered events are involuntary unemployment, disability, and hospitalization, however, embodiments of the present invention are not limited by these example covered events and includes all types of events that may be determined by a financial institution or entity providing the ER.

According to embodiments of the present invention, a set cash amount may be provided to a customer for a set amount of time. The set cash amount and the set amount of time may be determined by the financial institution or entity providing the ER. For example, an entity may provide an ER that provides benefits of $500/month for up to 6 months. Additional lifecycle events such as moving, childbirth and retirement may be covered with a one-time $500 benefit.

Moreover, according to embodiments of the present invention, a financial institution may provide a customer an option to add an optional debt cancellation protection feature to their Emergency Reserve. For illustrative purposes, this debt cancellation option may be called an Emergency Reserve Protection (ERP). The ERP protection would cancel an outstanding ER balance on a monthly basis during a covered event, resulting in the customer not having to repay anything. Therefore, should a covered event occur, a customer subscribing to the ER as well as the ERP would get the monthly cash allotment for the determined period, but would owe nothing at the conclusion of the cash payouts. This is advantageous in that a customer who has suffered a loss of income, but has enrolled in these services, gets needed cash immediately without incurring any additional debt.

Both the ER product and the ERP feature would be offered by the financial institution or entity. Embodiments of the present invention providing ER and an ERP features are advantageous in that an ER is "conditional credit" that is based on knowledge of actuarial exposure. ER being "conditional credit" means that the funds can only be accessed during a covered event. By then pricing that conditional credit based on a financial institution's significant incidence experience, the financial institution is able to severely mitigate the credit exposure. The mitigation of the credit exposure allows a financial institution to offer an ER product to virtually everyone, which is advantageous over current lending procedures.

FIG. 1 shows a system for providing emergency conditional credit according to an example embodiment of the present invention. The system may include a financial institution site 30 that includes a workstation 31 and the capability for sending and receiving mail 32. The system may also include a client site 10 that includes a workstation 11 and the capability to send and receive mail 12. The financial institution 30 may offer the ER product and ERP feature to a client at the client site 10 via an electronic communication means 12. The electronic communication means may be a network such as the Internet or any other type of wired or wireless electronic method of communication such as text, emails, etc. The financial institution 30 may offer the products, send applications and other documents related to the products, receive information and other documents from a client, and make cash pay-offs through the electronic communication means. Further, the client site 10, vendor site 20, and financial institution 30 may each have a apparatus 13, 23, 33, respectively, consisting of a storage medium that contains instructions stored therein, that when inserted and executed help perform at least some of the processing performed by the client site 10, vendor site 20, and financial institution 30.

Alternatively, the financial institution may send marketing materials, applications and other documentation related to the ER product and ERP feature via courier or mailing or any other non-electronic method. Similarly, a client at client site 10 having mail handling capability 12 may send completed applications for the ER product and ERP feature as well as other documentation (e.g., request for emergency reserve), to the financial institution via a courier, regular mail, etc.

Although not shown, if a client at a client site 10 has successfully completed an application for the ER product and has been approved, and qualifies for an emergency reserve disbursement, the financial institution 30 may deposit via electronic means a cash payment into a bank or other institution designated by the client.

Moreover, the financial institution 30 may desire that one or more third-parties or vendors 20 serve as an intermediary between a client at client site 10 and the financial institution 30 for performing various tasks related to the ER product and the ERP feature. For example, a vendor site 20 may include a work station 21 and mail handling capability 22, and may perform any of many various tasks related to the ER product and ERP feature. For example, the vendor site 20 may handle the distribution of marketing materials to potential customers, provide applications to potential customers, receive completed applications from people, process the applications, approve or disapprove customer applications, receive requests for emergency reserve payouts, process these requests, approve or disapprove these requests, or verify that customers still qualify for the ER product and/or ERP feature, etc. This may be advantageous to a financial institution 30 in that several tasks may be off-loaded onto one or more vendor sites 20 relieving the financial institution of performing the various processing, marketing, etc. activities related to managing the offering and maintaining of the ER product and the ERP feature. In this regard, the vendor site 20 may communicate with a client site 10 via an electronic method or network 16 as well as communicate with a financial institution 30 via an electronic communication method or network 18. The vendor site 20 may also provide the various services in a non-electronic way such as via courier, mail, etc.

To illustrate embodiments of the present invention, one or more vendors will be used for handling some of the ER/ERP processing between the customer site and the financial institution. Due to the vast amount of processing and other business activities that a financial institution must manage, delegating portions of the handling of the emergency reserve product and Emergency Reserve protection may be beneficial in off-loading work from the financial institution that can easily be performed by a vendor(s). However, embodiments of the present invention are not limited by the use of one or more vendors as an intermediary, and any embodiments where a financial institution directly handles the maintenance and processing of an ER and ERP are within the scope of the present invention.

Moreover, the use of the term vendor and vendor site in the descriptions of embodiments of the present invention the term vendor may be used to refer to one vendor or may refer to more than one vendor. Further, the term vendor may represent different types of vendors that perform different tasks or different functions, for example, list processing, forms processing, validation processing, approval/denial processing, credit processing, or any other activity or process that may be performed by some other entity outside of the financial institution and the customer site.

Figure 2:
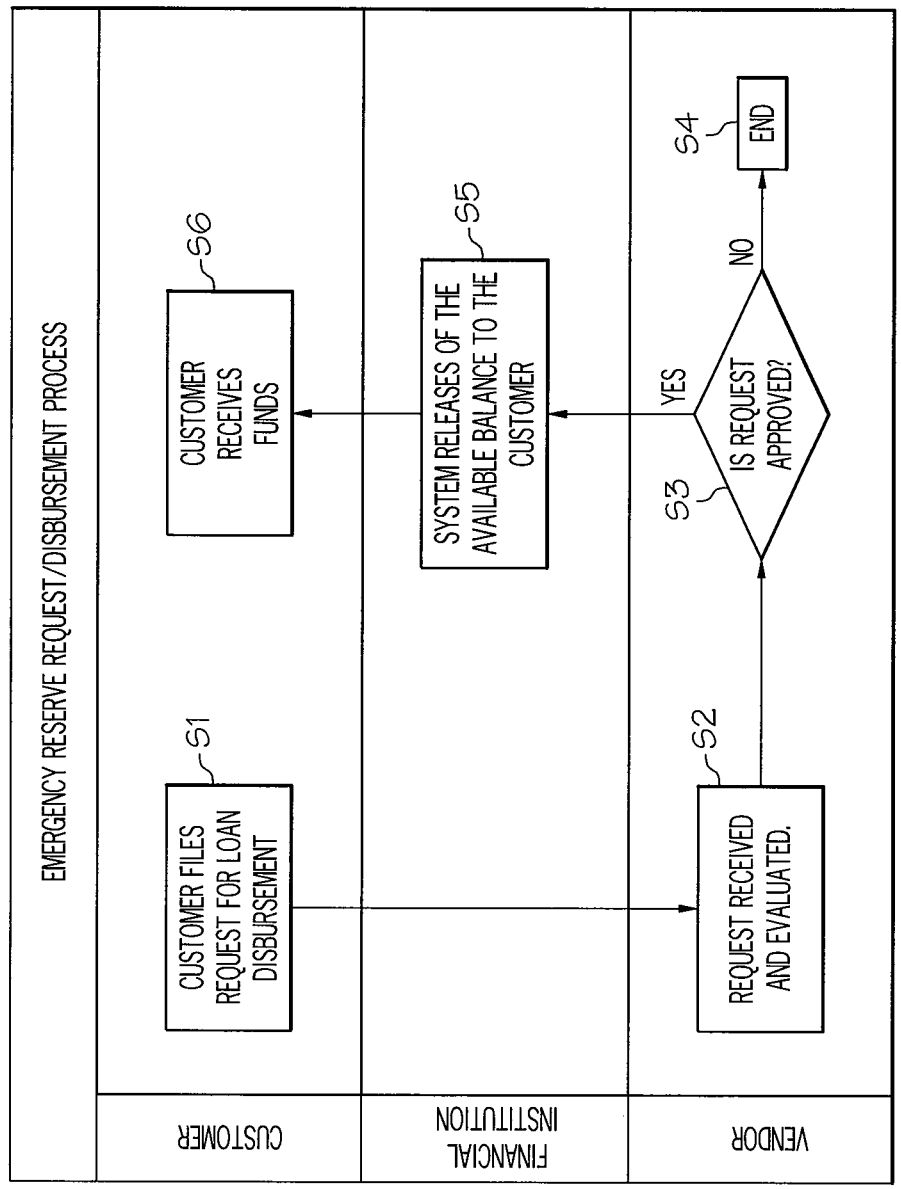
FIG. 2 is a flowchart of a process for an emergency reserve request and disbursement according to an example embodiment of the present invention.

FIG. 2 shows a flowchart of a process for an emergency reserve request and disbursement according to an example embodiment of the present invention. A customer at a customer site files a request for credit disbursement S1. A vendor company 20 receives the credit disbursement request and determines eligibility S2. The vendor determines if the request is approved and, if not, the process ends S4. If the request is approved S3, approval notification is sent to the financial institution 30. The financial institution 30 then releases the cash payment amount of the maximum amount payable to the customer S5. The customer then receives the emergency cash funds S6 and uses them appropriately.

Figure 3:
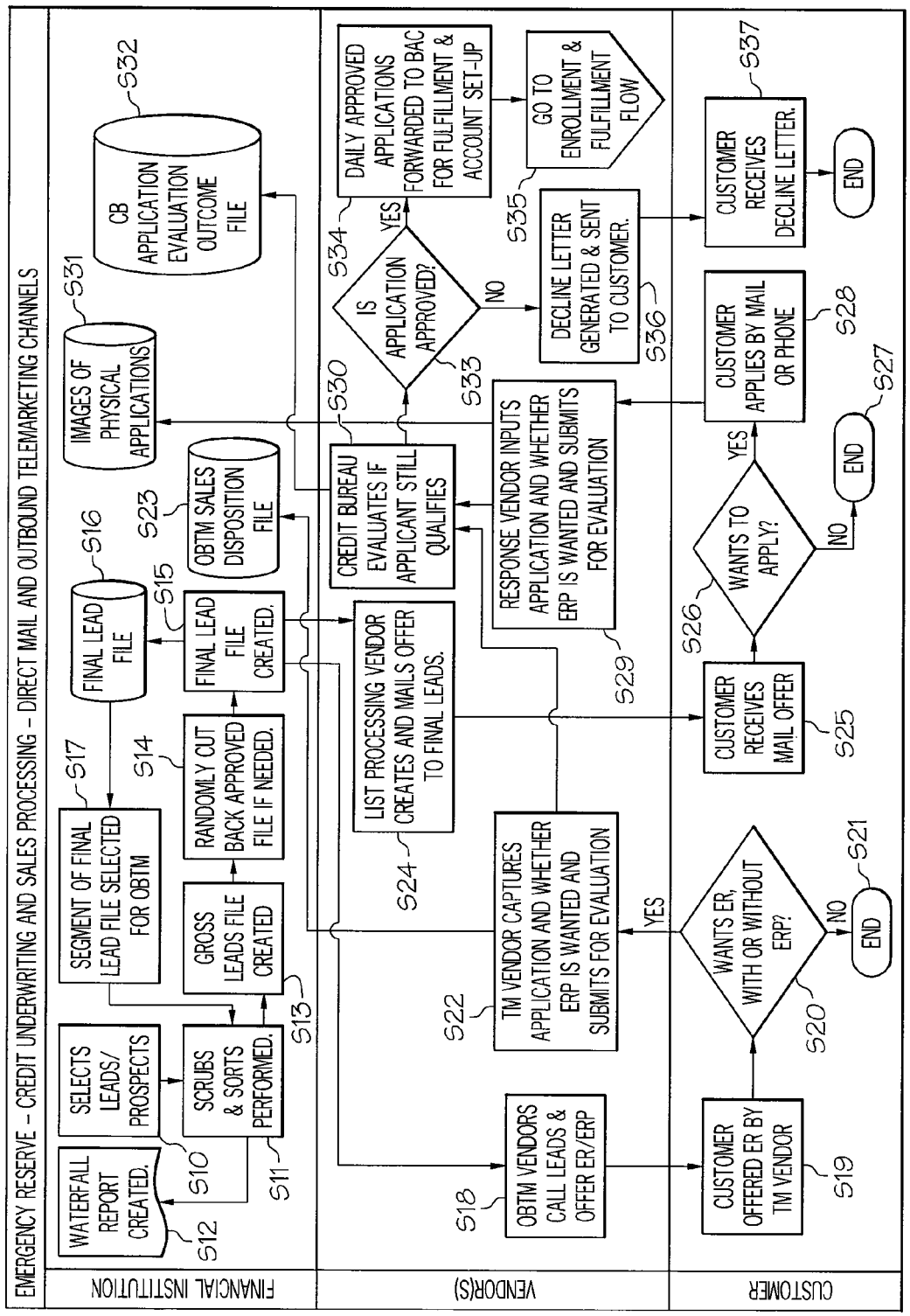
FIG. 3 is a flowchart of an emergency reserve credit underwriting and sales process according to an example embodiment of the present invention.

FIG. 3 shows a flowchart of an emergency reserve credit underwriting and sales process according to an example embodiment of the present invention. As illustrated in the figure, different functions and processes may be performed by the financial institution 30, a vendor site 20, and customer site 10. At the financial institution site 30, a marketing center may select leads/prospects for Emergency Reserve product S10. These leads and/or prospects may be scrubbed and sorted S11. A waterfall report may be created S12. The gross leads after being scrubbed and sorted may be stored in a file S13. The financial institution 30 may have set a maximum number of people to be targeted for marketing and/or offering of the ER product. If this is so, the information stored in the file may be further cut in a random or an ordered manner S14. A final lead file may then be created S15 and then stored S16. A segment of the final lead file may be selected for further processing S17. The process may repeat where the segment of the final lead file selected again undergoes scrubbing and sorting S11.

After the final lead file has been created S15, this file may be sent to a vendor. The vendor receives the final lead file and may contact the people on the list and offer them the ER product with or without the ERP feature S18. A person at a customer site may receive the ER and ERP offers, S19, and determine if the person would like to purchase these products S20. If the person does not desire these products, the process ends S21. However, if the person decides to purchase one or more of these products, the vendor is notified via receipt of an application from the person. The vendor captures the application and determines whether the ERP feature is also desired and submits the application to the financial institution for evaluation S22. The application information may be stored in a sales disposition file at the financial application S23. Further, the information may be sent to a credit bureau vendor that evaluates if the applicant (person) still qualifies for the ER product S30. A result of this application evaluation may be sent to the financial institution and stored S32.

A list processing vendor may also receive the final lead file from the financial institution and create and mail offers to the final leads S24. A person at the customer site may receive the mail offer S25 and determine if they want to apply S26, and if not the process ends S27. If the person decides to apply for the ER product, the person may apply by mail or phone S28. A vendor may then input the application from the person and determine whether the ERP feature is also desired and submit the application for evaluation to a credit bureau or credit verification vendor S29. The credit bureau may evaluate if the applicant still qualifies S30 and send this evaluation to the financial institution that may store the application evaluation outcome S32. The credit bureau vendor then may determine if the application is approved S33. If the application is not approved, a decline letter may be generated and sent to the person S36. The person may receive the decline letter S37 and the process ends. If the application is approved, this application and other approved applications may be forwarded to the financial institution for fulfillment and account set up S34. The response vendor, after inputting the application S29, may send the application to the financial institution for storage S31.

Figure 4:
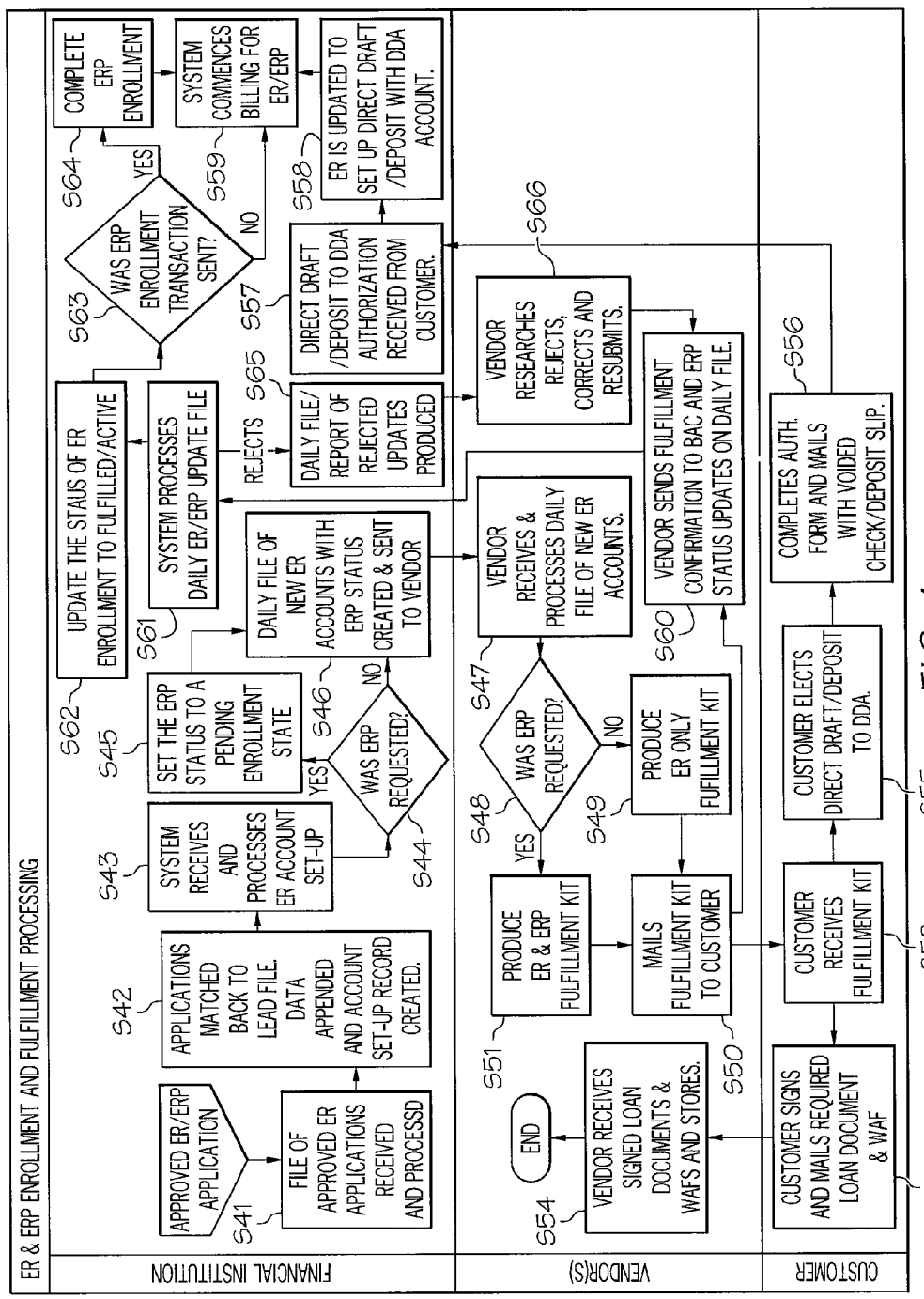
FIG. 4 is a flowchart of an ER and ERP enrollment and fulfillment process according to an example embodiment of the present invention.

FIG. 4 shows a flowchart of an ER and ERP enrollment and fulfillment process according to an example embodiment of the present invention. The approved ER/ERP application file is received and processed at the financial institution S41. The financial institution may receive several of these applications and process them simultaneously. The applications may be matched back to the lead file, data appended to the applications, and an account setup record created S42. The ER applications are processed and accounts setup S43, and it is determined whether the ERP feature was requested S44. If the ERP feature was requested, an ERP status may be set to a pending enrollment state S45. The financial institution may also create a daily file of new ER accounts with ERP status and send it to a processing vendor S46.

The processing vendor receives and processes the received daily file of new ER accounts S47, and determines whether the ERP feature was requested S48. If the ERP feature was not requested, only an ER fulfillment kit is produced S49, and the kit mailed to the person S50. If the ERP feature was requested, an ER and ERP fulfillment kit may be prepared S51, and mailed to the person S50.

At the customer site, the person receives the fulfillment kit S52, signs and mails the required credit documents to the processing vendor S53. The processing vendor then receives the signed credit documents and stores this information S54. The person may also elect direct draft/deposit to his direct deposit account S55, and complete an authorization form and send this form with appropriate other documentation (e.g., voided check/deposit slip) to the financial institution S56. The financial institution receives the direct draft/deposit to direct deposit account authorization from the customer S57, and updates the ER to set up direct draft/deposit with the direct deposit account S58. Billing then commences for the ER and ERP S59.

After mailing the fulfillment kit to the person S50, the processing vendor may then send fulfillment confirmation and ERP status updates on a daily file to the financial institution S60. The financial institution may process the daily ER/ERP update file S61. The financial institution may generate a daily file/report of rejected updates S65 and forward these to the processing vendor. The processing vendor may then research the rejects make any appropriate corrections and resubmit these to the financial institution S66. After processing the daily ER/ERP update file S61, the financial institution may update the status of the ER enrollment to fulfilled/active S62. The financial institution may then determine whether an ERP enrollment transaction was sent S63 and, if so, the ERP enrollment is completed S64. ER/ERP billing may then commence S59. If the financial institution determines that the ERP enrollment transaction was not sent S63, then the billing for the ERP may commence S59.

Figure 5A:
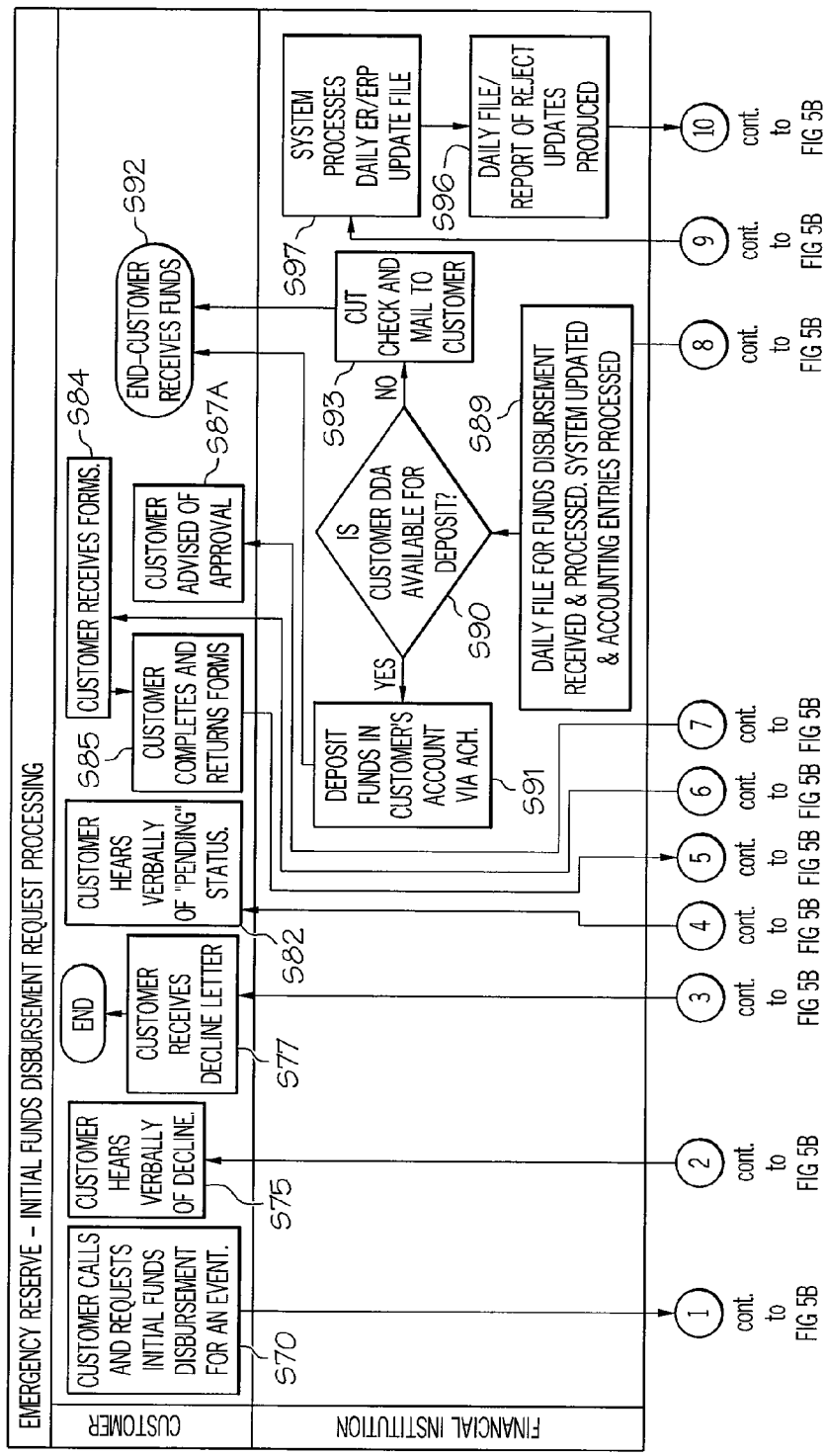
FIG. 5 is a flowchart of an emergency reserve initial credit disbursement request process according to an example embodiment of the present invention.
Figure 5B:
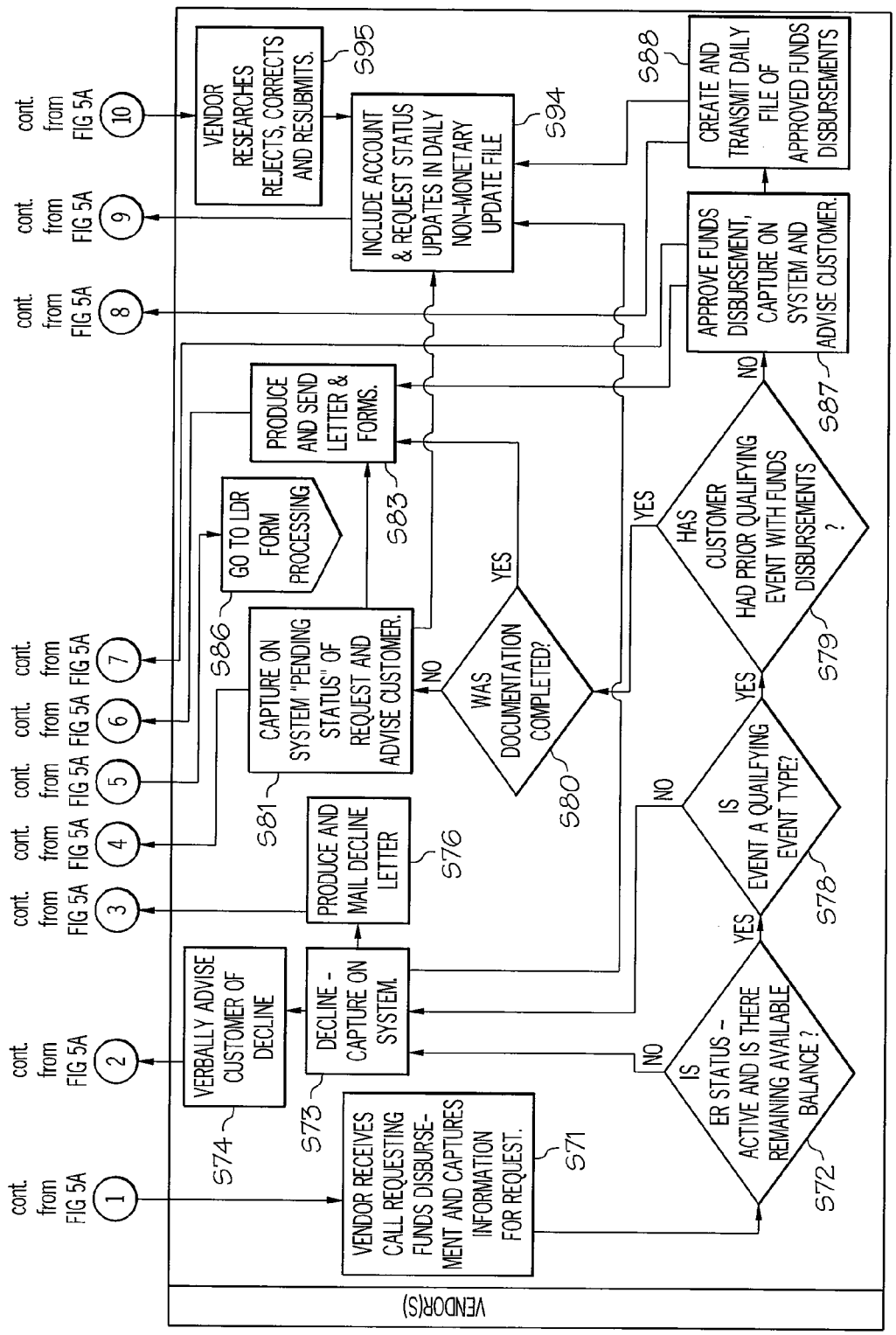

FIG. 5 shows a flowchart of an emergency reserve initial funds disbursement request process according to an example embodiment of the present invention. A customer may call and request an initial funds disbursement for an event S70. A processing vendor may receive the call requesting the funds disbursement and capture required information for the request S71. The processing vendor may then determine if the ER status is active and if there is any remaining balance to draw from S72. If the ER status is not active or there is no remaining balance, the request may be declined S73 and the customer advised of the decline decision S74. The customer may hear verbally or via other methods of the decline of the request S75.

If the ER status is active and there is a remaining balance, the processing vendor may determine whether the event is a qualifying event type S78, and if not, the request is denied/declined S73 as noted previously. Alternatively the vendor may produce and mail an advisory letter to the client S76, and the customer receive the decline letter S77. If the event is a qualifying event, the processing vendor may then determine if the customer has had a prior qualifying event with fund disbursements S79. If the customer has had a prior qualifying event with funds disbursements, the processing vendor may determine whether documentation was completed S80, and if not, set a system pending status on the request and advise the customer S81. The customer may then be notified verbally of the pending status S82. Further, the processing vendor may also produce and send letters and forms related to the pending status to the customer S83. Similarly, if the documentation was completed, the processing vendor may produce and send letters and/or forms to the customer S83. The customer receives the forms S84, and completes and may return the forms to a processing center of the vendor S85 for credit disbursement form processing.

After the pending status is set for the request and the customer advised by the processing vendor S81, account and request status updates may be included in a daily non-monetary update file S94. Further, if it is determined that the customer did not have a qualifying event with funds disbursements, the funds disbursement may be approved S87 and the customer advised accordingly S87A. A daily file of approved funds disbursements may be created and transmitted S88 by a processing vendor to the financial institution and account and request status updates included in the daily non-monetary update file S94. The financial institution may receive and process the daily file for funds disbursement, and updates and processes accounting entries S89. The financial institution may then determine if the customer has direct deposit account (DDA) available for deposit S90 and, if not, may cut a check and mail the check to the customer S93 where the customer then receives the funds via check S92. If a direct deposit account is available, the funds may be deposited into the customer's direct deposit account S91 where the customer then has access to the funds S92.

After the account and request status updates have been included in the daily non-monetary update file S94, a daily ER/ERP update file may be processed S97. A daily file/report of reject updates may be produced S96, and sent to the processing vendor. The processing vendor may then research the rejects, make any appropriate corrections and resubmit S95 where the account and request status updates are included again in the daily non-monetary update file S94.

Figure 6A:
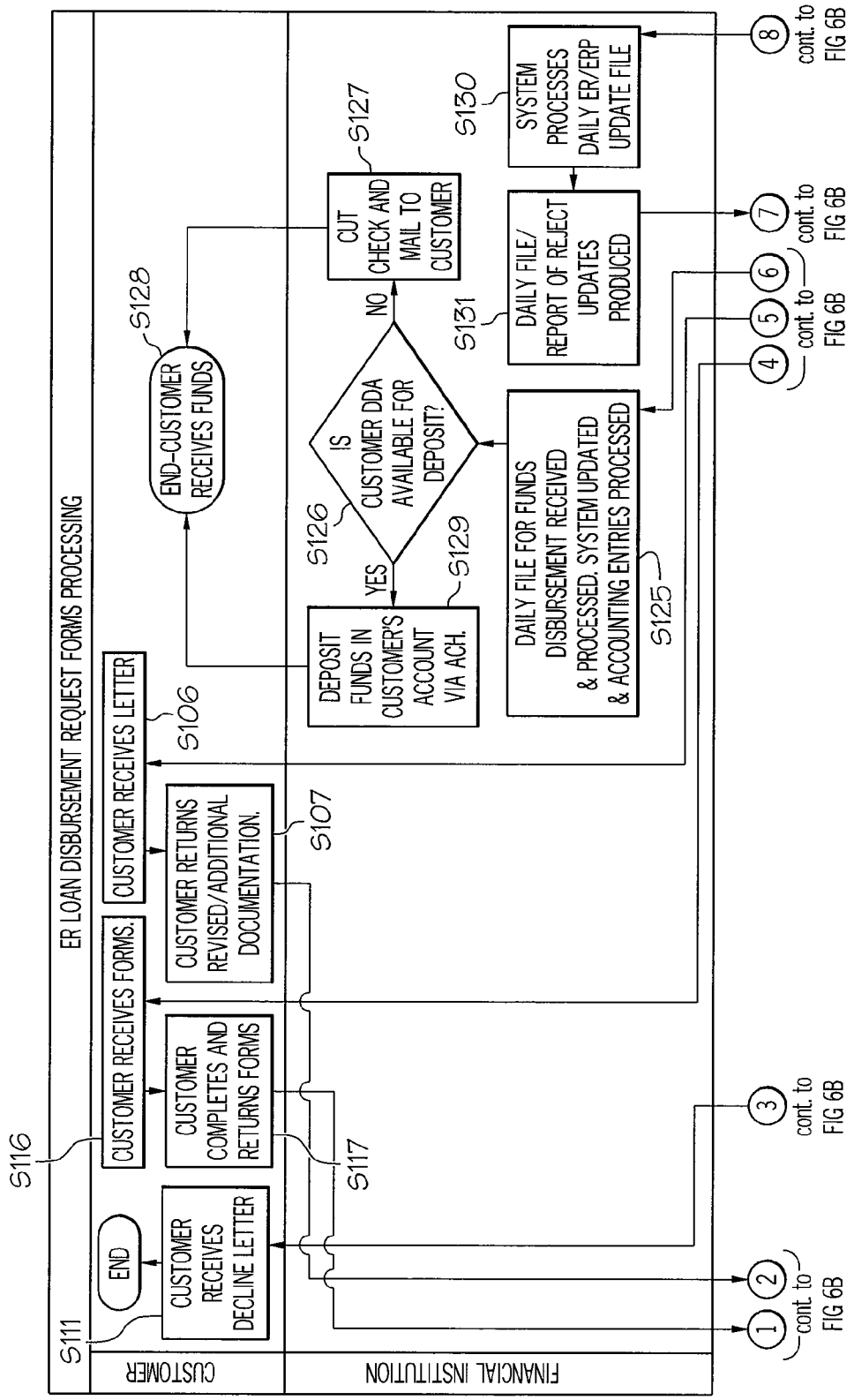
FIG. 6 is a flowchart for a continuing ER credit disbursement process according to an example embodiment of the present invention.
Figure 6B:
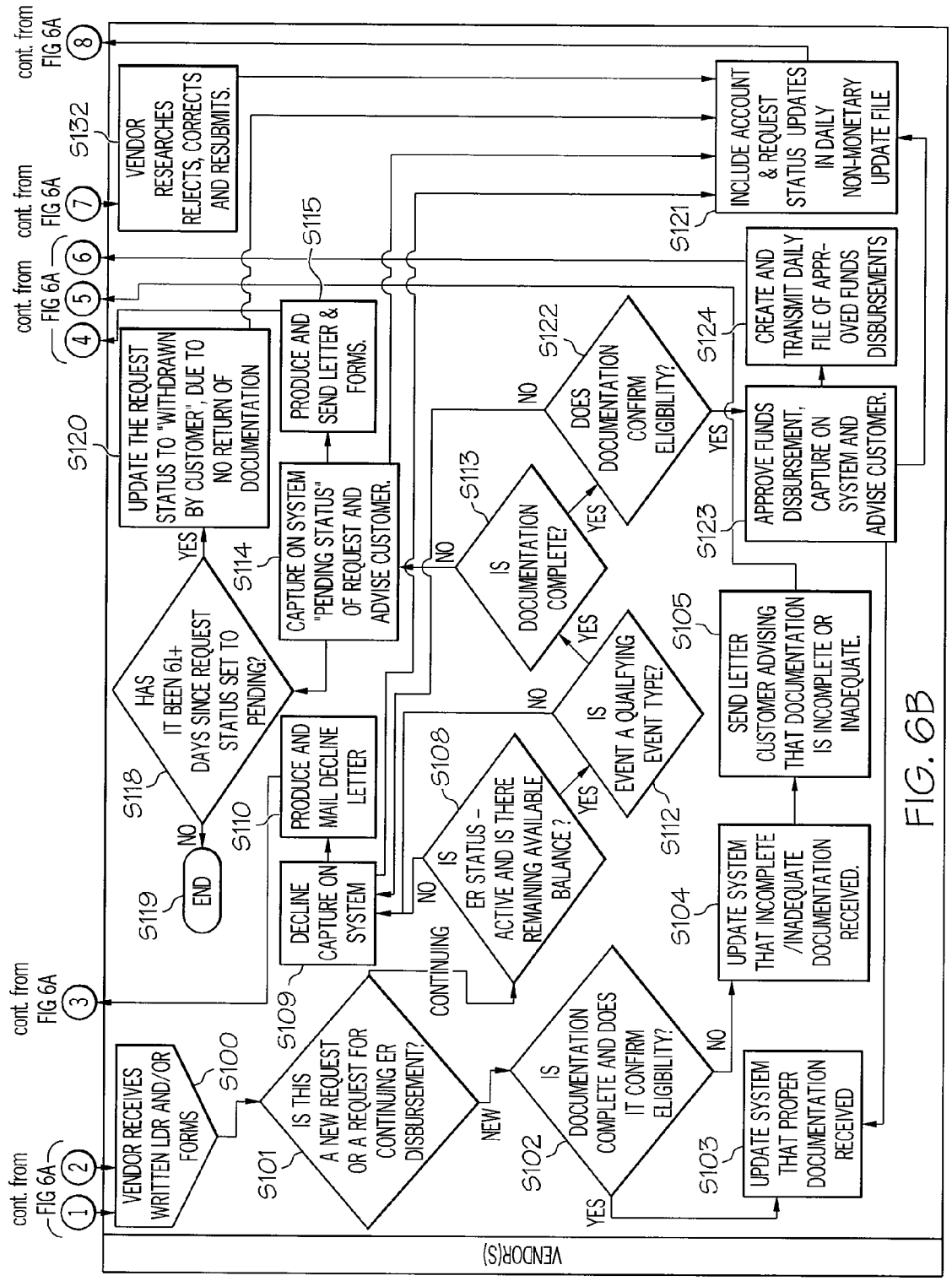

FIG. 6 shows a flowchart for a continuing ER credit disbursement forms evaluation process according to an example embodiment of the present invention. A processing vendor receives written (or electronic) benefit request and/or documentation forms S100. The processing vendor determines if this is a new request or a request for continuing ER benefit S101. If this is a new request, the processing vendor determines whether documentation is complete and does the documentation confirm eligibility S102. If the documentation is complete, the system is updated that proper documentation has been received S103. If the documentation is not complete, the system is updated that incomplete/inadequate documentation has been received S104, and the customer is notified and advised that the documentation is incomplete or inadequate S105. The customer receives the notification, S106, and may return the revised/additional documentation to the processing vendor S107.

If it is determined that this is a continuing ER benefit, S101, the processing vendor may determine if the ER status is active and if there is a remaining balance to draw S108. If the ER status is not active or there is no remaining balance, the request is declined S109, and a client letter saying the same may be prepared and mailed or electronically transferred to the customer S110. The customer receives the decline letter and the process ends S111.

If the ER status is active and there is a remaining balance, the processing vendor determines whether the event is a qualifying event type S112, and if not, again the request is declined S109, and a letter sent to the customer S110. However, if the event is a qualifying event, the processing vendor determines whether the documentation is complete S13. If the documentation is not complete, a pending status is captured on the system regarding the request S114, and a letter and appropriate forms produced S115, and transferred to the customer. The customer receives the forms S116, completes and returns the forms S117, and the processing vendor receives the completed documentation forms S100 and the process resumes. Further, after the pending status has been captured on the system S114, the processing vendor determines if a certain amount of days have passed since the request status has been set to "pending" S118, and if not, this part of the process ends S119. If the certain amount of time since the status has been set to "pending" has occurred, the processing vendor may update the request status to "withdrawn by customer due to no return of documentation" S120, and include account and request status updates in the daily non-monetary update file S121.

If it is determined that the documentation is complete S113, the processing vendor determines does the documentation confirm eligibility S122. If the documentation does not confirm eligibility, the request may be declined S109, and the customer notified. If the documentation does confirm eligibility, the funds disbursement may be approved and the approval captured on the system S123. A daily file of approved funds disbursements may be created and transmitted to the financial institution S124. This daily file is received and processed by the financial institution S125. The financial institution may then determine if the customer has a direct deposit account available for deposit S126, and if not, cut a check and mail the check to the customer S127. If a direct deposit account is available, the funds are deposited into the customer's direct deposit account S129. The customer may then receive the funds either from the received check or from funds in the direct deposit account S128.

After the approval of funds S123, the processing vendor may include the account and request status updates in the daily non-monetary update file S121. The financial institution may receive and process the daily ER/ERP updates file S130, produce a daily file/report of rejected updates S131, and transmit this to the processing vendor. The processing vendor receives the daily file/report, researches, rejects, and makes any appropriate corrections, and resubmits S132. The processing vendor then includes account and request status updates in the daily non-monetary update file S121.

Figure 7:
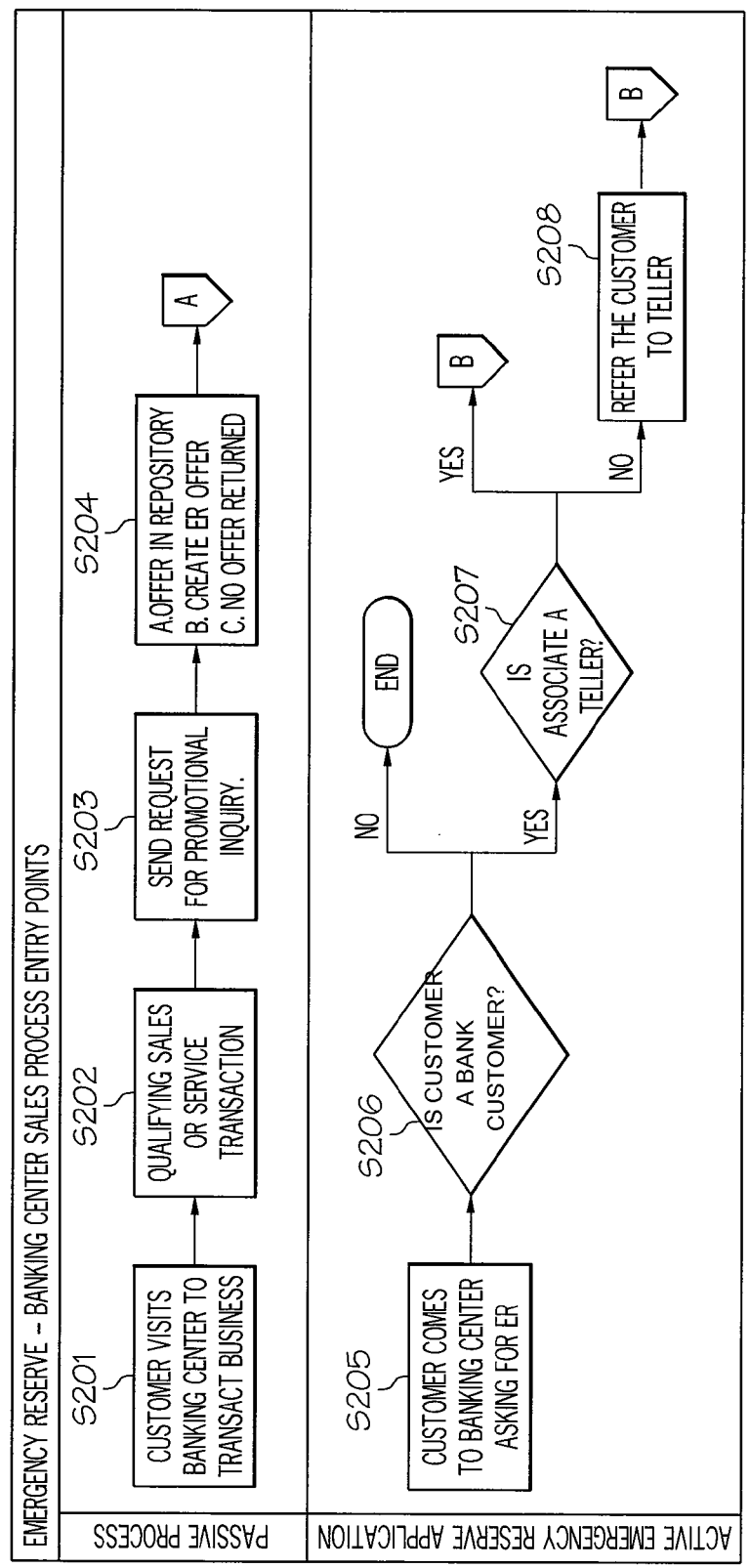
FIG. 7 is a flowchart of a process for an emergency reserve at a banking center according to an example embodiment of the present invention.

FIG. 7 shows a flowchart of a process for an emergency reserve at a banking center according to an example embodiment of the present invention. This process may include a passive process and an active emergency reserve activation process. In the passive process, a person visits a banking center to transact business, S201. The person performs qualifying sales or a service transaction, S202. A request may be sent for promotional inquiry, S203. Then, (a) an offer is in a repository, (b) an emergency reserve offer, that may include emergency reserve protection, is created or (c) no offer is returned, S204. This process then proceeds to block S209 in FIG. 8.

In the active emergency reserve application process, a person comes to the banking center asking for an emergency reserve, S205. It may be determined whether the person is a banking center customer, S206, and if not the process ends. If the person is a banking center customer, it may be determined if an associate helping the person is a teller, S207, and if not, the person may be referred to a teller, S208. The process then proceeds in either case to block S224 in FIG. 9.

Figure 8:
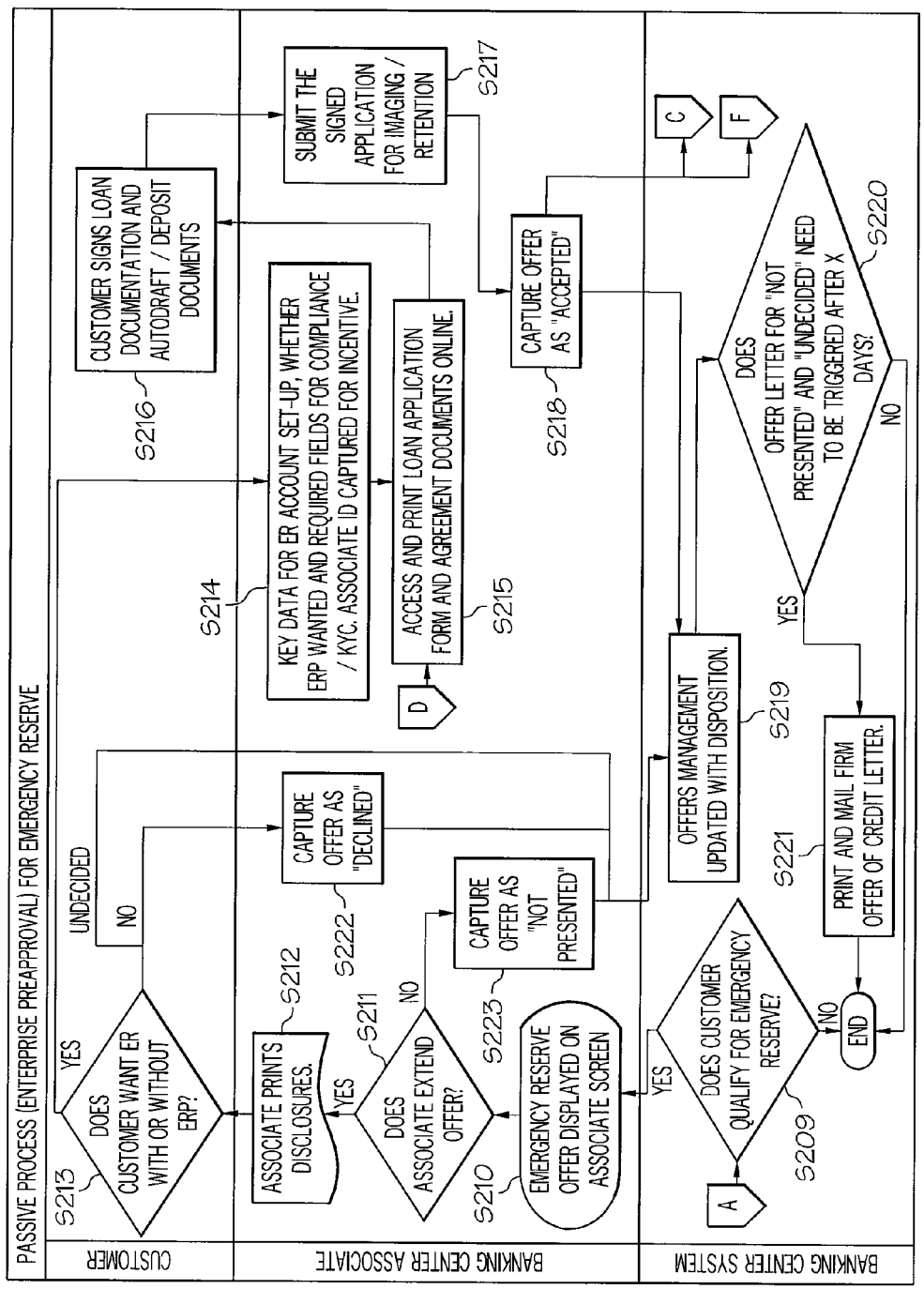
FIG. 8 is a flowchart of an enterprise pre-approval portion of the passive process of FIG. 7 according to an example embodiment of the present invention.

FIG. 8 shows a flowchart of an enterprise pre-approval portion of the passive process of FIG. 7 according to an example embodiment of the present invention. It may be determined whether the person qualifies for an emergency reserve, S209, and if not, the process ends. If the person qualifies for an emergency reserve, an emergency reserve offer may be displayed on an associates screen, S210. It may be determined if the associate has extended an offer, S211, and if not, the offer may be captured as "Not presented," S223. Offers Management may be updated with the disposition, S219. Then, it may be determined whether an offer letter for "not presented" and "undecided" needs to be triggered after a certain number of days, S220, and if not, the process ends. If it is determined that an offer letter needs to be triggered, a firm offer of credit letter may be printed and mailed, S221, and the process ends. If the associate does extend an offer, S211, the associate may print the disclosures, S212. Then, it may be determined whether the person wants the emergency reserve, S213, and if not, the offer may be captured as "declined," S222, Offers Management updated with disposition, S219, and the determination of whether an offer letter should be triggered, S220, and printed and mailed, S221, may occur as previously discussed.

If the person is undecided regarding wanting Emergency Reserve, Offers Management may be updated with the disposition S219 and the determination of whether an offer letter is triggered, S220, and printing and mailing of an offer of credit letter, S221, may occur as previously mentioned. If the person does want Emergency Reserve, with or without Emergency Reserve Protection, S213, data may be keyed for an emergency reserve account set up and required fields for compliance/KYC. The associate ID may be captured for an associate incentive, S214. The credit application form and agreement documents may be accessed on-line and printed, S215. The customer may sign the credit documentation and auto-draft/deposit documents, S216. The signed application may be submitted for imaging/retention, S217, the offer captured as "accepted," S218, and the process proceed to blocks S236 and S251 in FIG. 10.

Figure 9:
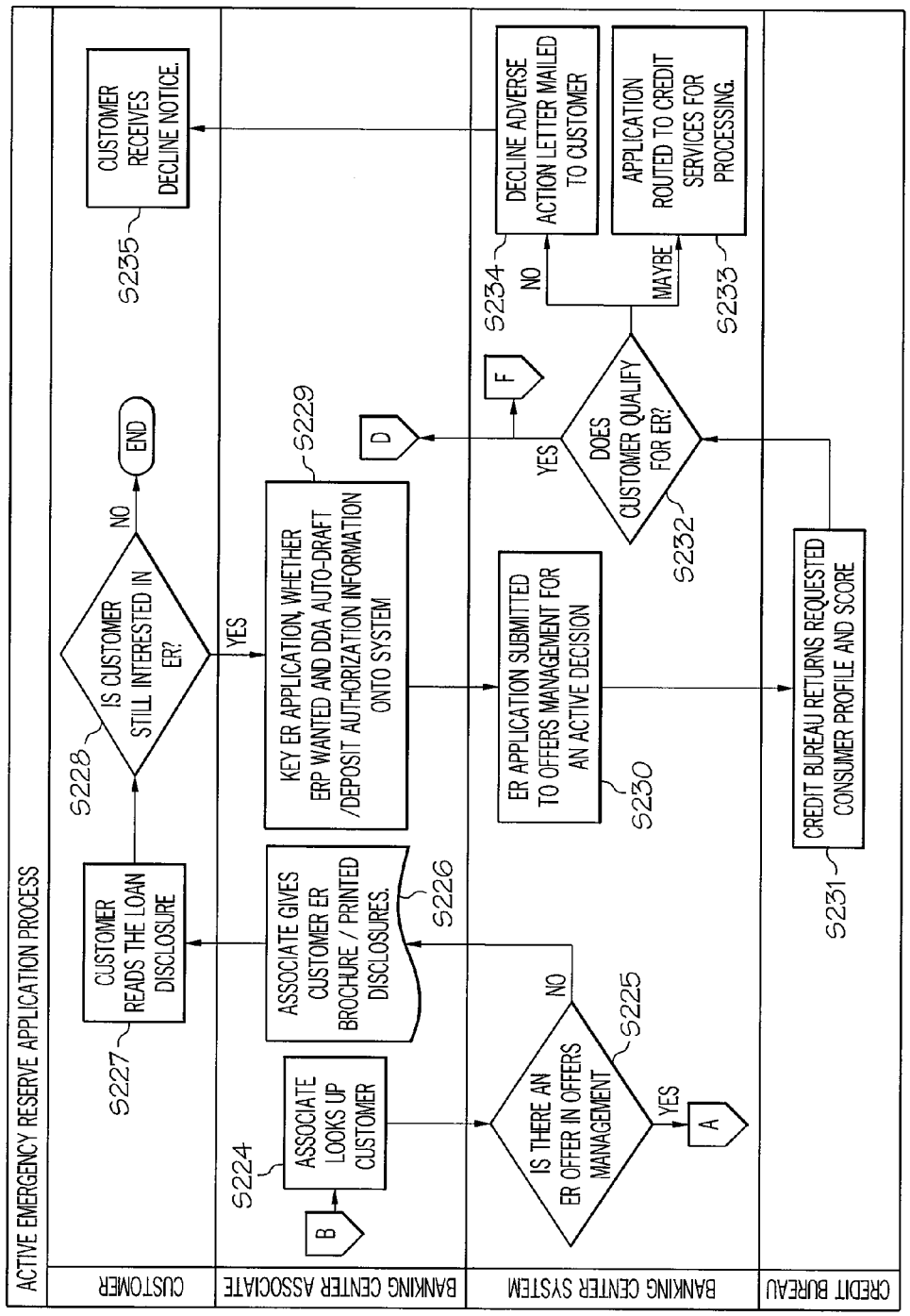
FIG. 9 is a flowchart of a further portion of the active emergency reserve application process of FIG. 7 according to an example embodiment of the present invention.

FIG. 9 shows a flowchart of a further portion of the active emergency reserve application process of FIG. 7 according to an example embodiment of the present invention. An associate may look up a person, S224. It may be determined whether there is an emergency reserve offer in Offers Management, S225, and if so, the process continues to block S209 in FIG. 8. If there is no offer in Offers Management, an associate may give the person emergency reserve brochures and other printed disclosures, S226. The person reads the credit disclosures, S227. It may be determined whether the person is still interested in Emergency Reserve, S228, and if not, the process ends. If the person is interested in Emergency Reserve, an emergency reserve application and direct deposit account (DDA) auto-draft/deposit authorization information may be keyed into the system, S229. The emergency reserve application may be submitted to Offers Management for an active decision, S230. A credit bureau may return a requested consumer profile and score, S231. It may be determined whether the person qualifies for the emergency reserve, S232, and if so, the process proceeds to block S215 in FIG. 8 and block S251 in FIG. 10. If the person might qualify for Emergency Reserve, the application may be routed to credit services for processing, S233. If the person does not qualify for emergency reserve, a decline adverse action letter may be mailed to the person, S234, and the person may receive the decline notice, S235.

Figure 10:
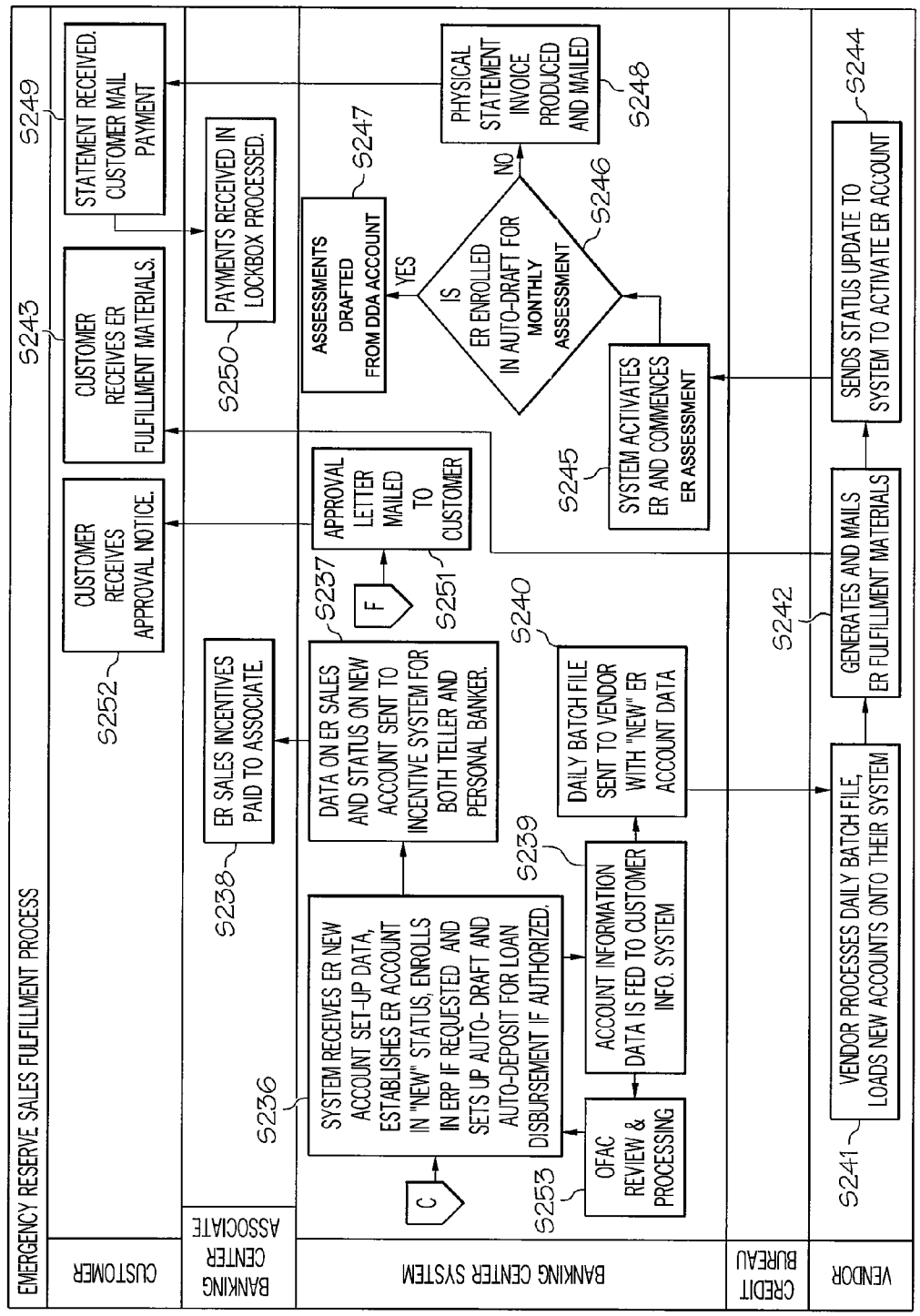
FIG. 10 is a flowchart of an emergency reserve sales fulfillment process according to an example embodiment of the present invention.

FIG. 10 shows a flowchart of an emergency reserve sales fulfillment process according to an example embodiment of the present invention. This process is a part of the passive process and active emergency reserve activation process mentioned previously. A banking center system may receive the emergency reserve new account set up data with or without emergency reserve protection, establish an emergency reserve account in "new" status and set up auto-draft and auto-deposit for credit disbursement if authorized, S236. Account information data may be fed to the customer information system, S239. Review and processing may occur, S253. After the system receives the emergency reserve new account set up data, S236, the data on emergency reserve sales and status on new account may be sent to an incentive system for both teller and personal banker, S237, and emergency reserve sales incentives paid to the associate, S238.

After the account information data is fed to the customer information system, S239, a daily batch file may be sent to a vendor with "new" emergency reserve account data, S240. The vendor may process the daily batch file, and load new accounts onto their system, S241. The vendor may generate and mail emergency reserve fulfillment materials, S242. The person receives the emergency reserve fulfillment materials, S243. An approval letter may be mailed to a person, S251, and the person receives the approval notice, S252. After the vendor generates and mails the emergency reserve fulfillment materials, S242, the vendor may send a status update to the banking system to activate the emergency reserve account, S244. The system may activate the emergency reserve and commence emergency reserve assessment, S245. It may be determined whether the emergency reserve is enrolled in auto-draft for periodic assessment, S246, and if so, assessments may be drafted from a direct deposit account, S247. If the emergency reserve is not enrolled in an auto-draft, a physical statement invoice may be produced and mailed, S248, the statement received by a customer and the customer mail the payment, S249, and the payments received in a lockbox by a banking center associate and processed, S250.

Figure 11:
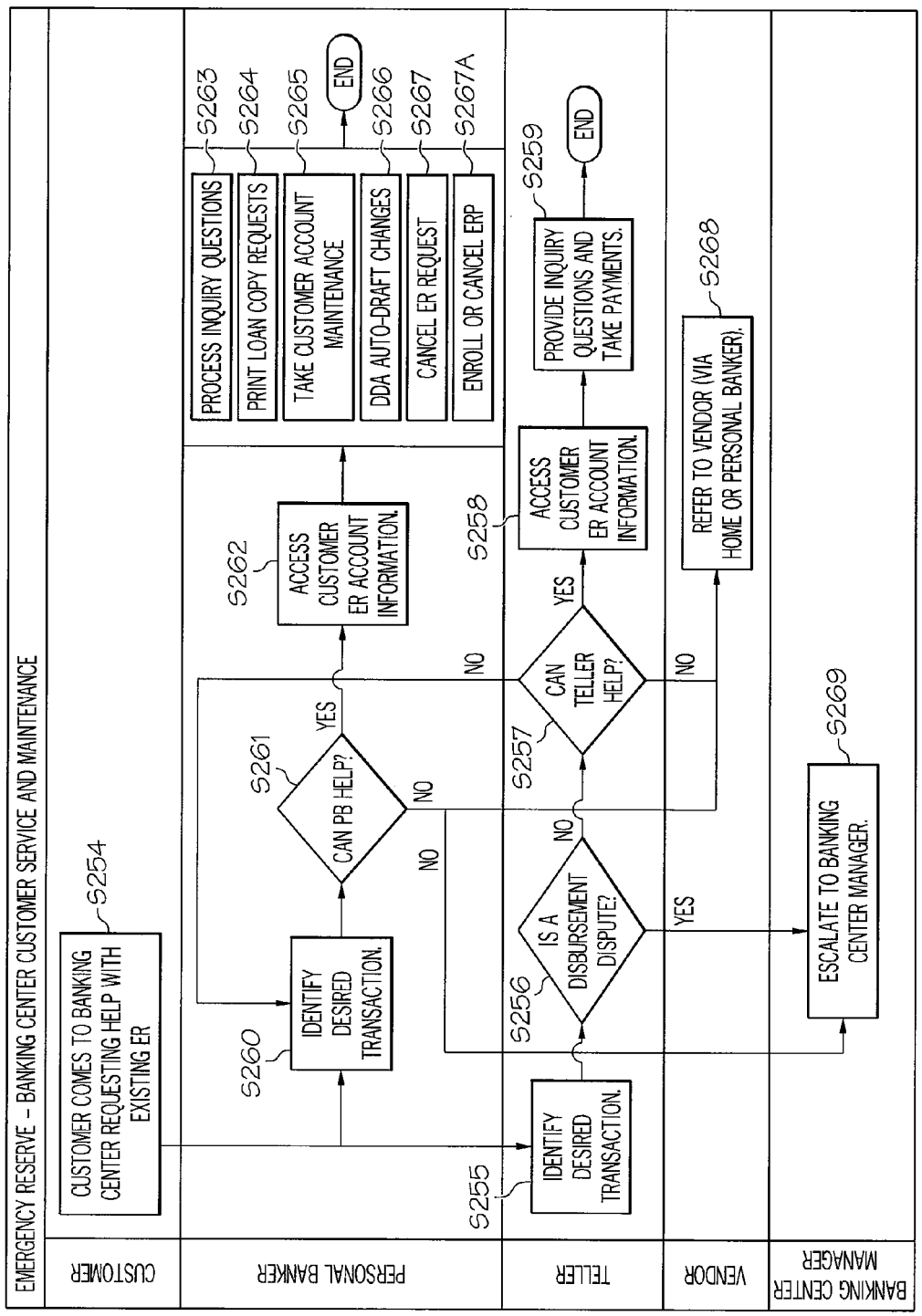
FIG. 11 is a flowchart of an emergency reserve banking center and maintenance process according to an example embodiment of the present invention.

FIG. 11 shows a flowchart of an emergency reserve banking center and maintenance process according to an example embodiment of the present invention. A customer comes to a banking center requesting help with an existing emergency reserve, S254. A personal banker may identify a desired transaction, S260, and determine whether the personal banker can help, S261. If the personal banker cannot help, the customer may be referred to a vendor, S268, or may escalate to a banking center manager, S269. If the personal banker can help, the customer emergency reserve account information may accessed by the personal banker, S262, the personal banker may then process inquiry questions, S263, print credit copy requests, S264, take customer account maintenance, S265, make direct deposit account auto-draft changes, S266, cancel a request, S267 or enroll or cancel emergency reserve protection S267A, and then the process ends.

Moreover, after the customer comes to the banking center requesting help, S254, a teller may identify the desired transaction, S255, and determine whether it is a disbursement dispute, S256. If it is a disbursement dispute, the matter may escalate to a banking center manager, S269. If it is not a disbursement dispute, it may be determined whether the teller can help, S257, and if not, the customer may be referred to a vendor, S268, or a personal banker. If it is determined that the teller can help, the teller may access the customer's emergency reserve account information, S258, provide inquiry questions and take payments, S259, and the process ends.

System and method embodiments according to the present invention are advantageous for several reasons. For example, people having lesser credit worthiness are able to obtain credit when these people may not typically qualify for credit. Further, the use of actuary information provides a lower exposure to financial institutions in offering these conditional credit products. Moreover, by offering these type products to current financial institution customers, the attrition of existing customers is minimized since without these products these customers may need to close their accounts to survive. Further, the ER product and ERP feature are versatile in that the initial cash amount may be varied as well as the maximum payout amount. In this regard, the cost on a periodic basis to a customer may vary accordingly depending on these amounts.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for providing conditional credit comprising:
    receiving, by a computing device processor, past history of customers incurring predetermined events;
    determining, by the computing device processor, actuarial data using the past history of customers incurring predetermined events, the actuarial data useable to predict future events;
    determining, by the computing device processor, a cost for offering an emergency reserve (ER) product using the actuarial data;
    determining, by the computing device processor, a qualification standard for the ER product;
    offering the ER product to the customers or potential customers based at least in part on the qualification standard;
    offering an optional emergency reserve protection (ERP) feature to the customers or the potential customers, the ERP feature providing protection that cancels any owed ER balance during a covered event;
    receiving, from a customer that accepted the offer of the ER product and the ERP feature, a first indication that one of a plurality of covered events has occurred and a request for a first credit disbursement from the ER product;
    verifying the customer's occurrence of the covered event and that the customer is current in paying a periodic assessment associated with the ER Product;
    automatically providing, by the computing device processor, the first credit disbursement to the customer based on verification of the covered event, wherein the first credit disbursement is for a predetermined amount that is less than a maximum credit disbursement amount of the ER product and for a predetermined period of time;
    receiving, from the customer proximate in time to expiration of the predetermined period of time, a second indication that the covered event continues to occur and a request for a second credit disbursement from the ER product;
    verifying the customer's continual occurrence of the covered event and that the customer is current in paying the periodic assessment associated with the ER Product;
    automatically providing, by the computing device processor, the second credit disbursement to the customer based on verification of the covered event wherein the second credit disbursement is for the predetermined amount and for the predetermined period of time;
    determining that the customer has accrued an owed ER balance as a result of the first credit disbursement and the second credit disbursement; and
    canceling, by the computing device processor, the owed ER balance based upon (i) determining that the customer has accrued the owed ER balance as a result of the first credit disbursement and the second credit disbursement and (ii) the customer's acceptance of the offer of the ERP feature.

2. The method according to claim 1, wherein the customer is eligible for the credit disbursements if the customer has previously purchased the ER product, has requested the credit disbursement for an entered event, and the entered event is said covered event.

3. The method according to claim 1, wherein the covered event comprises at least one of involuntary unemployment, disability, hospitalization, lifecycle events, moving, childbirth, or retirement.

4. The method according to claim 1, wherein determining the qualification standard further comprises determining the qualification standard using credit score information, alternative credit scoring information employing at least one of utility data and telecommunications payments data, and proprietary customer behavioral data.

5. The method according to claim 4, wherein the credit score information comprises at least one of Fair, Isaac and Company (FICO) information, Fair, Isaac and Company's Expansion Score or LexisNexis RiskView.

6. The method according to claim 4, wherein the qualification standard comprises credit scores lower than credit scores required for credit card qualification.

7. The method according to claim 4, wherein the qualification standard comprises at least one of no hit or 'thin-file' credit scores.

8. The method according to claim 1, further comprising:
    receiving acceptance of the offer from one or more of the customers; and
    charging the customers that accept the offer a periodic assessment for the ER product.

9. The method according to claim 8, wherein automatically providing further comprises
    performing, by the computing device processor, one of directly depositing the first or second credit disbursement into an account of the customer or initiating mailing a check for the first or second credit disbursement to the customer.

10. The method according to claim 1, wherein offering further comprises offering the ER product to a financial institution's customers or the financial institution's potential customers by one of the financial institution or a third party for the financial institution.

11. The method according to claim 10, wherein offering further comprises offering the ER product to the financial institution's customers or the financial institution's potential customers by the third party for the financial institution, the third party further performing at least one of sending materials offering the ER product to a financial institution's customers or the financial institution's potential customers, processing customer applications for the ER product, approving and denying customer applications for the ER product and notifying customers accordingly, receiving the requests for the credit disbursements for the entered event, verifying that the entered event is a covered event, approving and denying requests for the credit disbursements for the entered event, or sending information regarding the ER product to the customer after the processing is completed and the customer is approved.

12. The method according to claim 1, further comprising offering, along with the ER product, optional emergency reserve protection (ERP) feature to the customers or the potential customers, the ERP feature providing protection that cancels any ER balance on a monthly basis during a covered event.

13. The method according to claim 12, further comprising:
    receiving acceptance of the ER product and the ERP feature offers from one or more of the customers; and charging the customers that accept the ER product and ERP feature offers a first periodic assessment for the ER product and a second periodic assessment for the ERP feature.

14. The method according to claim 12, wherein offering the ERP feature further comprises offering the ERP feature to the customers or the potential customers by one of a financial institution or a third party for the financial institution.

15. The method according to claim 14, wherein offering the ERP feature further comprises offering the ERP feature to the customers or the potential customers by the third party for the financial institution, the third party further performing at least one of sending materials offering the ERP feature to customers, processing customer applications for the ERP, or sending information regarding the ERP feature to the customer after the processing is completed.

16. The method according to claim 1, wherein determining the cost further comprises determining the predetermined amount of the credit disbursements, the predetermined period of time, and the maximum credit disbursement amount of the ER product.

17. The method according to claim 1, further comprising determining if the customer has been provided a previous credit disbursement from the ER product.

18. The method according to claim 17, further comprising determining if a total credit disbursement made to the customer equals the maximum credit disbursement amount and performing one of providing a credit disbursement for the covered event if the maximum credit disbursement amount has not been paid or denying the request for a credit disbursement for the covered event if the maximum credit disbursement amount has been paid.

19. A system for providing conditional credit comprising:
a computing device having a memory and a processor;
a first application stored in the memory, executable by the processor and configured to receive past history of customers incurring predetermined events and determine actuarial data using the past history of financial institution customers incurring specified events, the actuarial data useable to predict future specified events;
a second application stored in the memory, executable by the processor and configured to determine a cost for offering an emergency reserve (ER) product and an optional emergency reserve protection (ERP) feature using the actuarial data, and determine a qualification standard for the ER product and the ERP feature;
a third application stored in the memory, executable by the processor and configured to automatically provide a first credit disbursement from the ER product to a customer that has (1) accepted an offer for the ER product and the ERP feature, the ERP feature providing protection that cancels any owed ER balance during a covered event, and (2) requested the first credit disbursement based on an occurrence of one of a plurality of covered events, based on verification of the occurrence of the covered event and verification that the customer is current in paying a periodic assessment associated with the ER Product, wherein the first credit disbursement is for a predetermined amount that is less than a maximum credit disbursement amount of the ER product and for a predetermined period of time; provide a second credit disbursement from the ER Product to the customer that has requested, proximate in time to expiration of the predetermined period of time, the second credit distribution based on continual occurrence of the covered event, based on verification of the continual occurrence of the covered event and verification that the customer is current in paying the periodic assessment associated with the ER Product, wherein the second credit disbursement is for the predetermined amount and for the predetermined period; determine that the customer has accrued an owed ER balance as a result of the first credit disbursement and the second credit disbursement; and cancel the owed ER balance based upon (i) determining that the customer has accrued the owed ER balance as a result of the first credit disbursement and the second credit disbursement and (ii) the customer's acceptance of the offer of the ERP feature.

20. An article, the article comprising a non-transitory computer-readable storage medium with instructions stored therein, the instructions when executed causing a processing device to perform:
receiving past history of customers incurring predetermined events;
determining actuarial data using the past history of customers incurring predefined events, the actuarial data useable to predict future specified events;
determining a cost for offering an emergency reserve (ER) product using the actuarial data;
determining a qualification standard for the ER product;
offering the ER product to the customers or potential customers based at least in part on the qualification standard;
offering an optional emergency reserve protection (ERP) feature to the customers or the potential customers, the ERP feature providing protection that cancels any owed ER balance during a covered event;
receiving, from a customer that accepted the offer of the ER product and the ERP feature, a first indication that one of a plurality of covered events has occurred and a request for a first credit disbursement from the ER product;
verifying the customer's occurrence of the covered event and that the customer is current in paying a periodic assessment associated with the ER Product;
automatically providing the first credit disbursement to the customer based on verification of the covered event, wherein the first credit disbursement is for a predetermined amount that is less than a maximum credit disbursement amount of the ER product and for a predetermined period of time;
receiving, from the customer proximate in time to expiration of the predetermined period of time, a second indication that the covered event continues to occur and a request for second credit disbursement a second credit disbursement from the ER product;
verifying the customer's continual occurrence of the covered event and that the customer is current in paying the periodic assessment associated with the ER Product;
automatically providing the second credit disbursement to the customer based on verification of the covered event wherein the second credit disbursement is for the predetermined amount and for the predetermined period of time;
determining that the customer has accrued an owed ER balance as a result of the first credit disbursement and the second credit disbursement; and
canceling the owed ER balance based upon (i) determining that the customer has accrued the owed ER balance as a result of the first credit disbursement and the second credit disbursement and (ii) the customer's acceptance of the offer of the ERP feature.

21. The article according to claim 20, wherein the covered event comprises at least one of involuntary unemployment, disability, or hospitalization.

22. The article according to claim 20, wherein the qualification standard is determined using credit score information.

23. The article according to claim 22, wherein the qualification standard comprises at least one of no-hit or thin file credit scores.

24. The article according to claim 20, the instructions when executed further causing the processing device to perform charging customers a periodic assessment for the ER product.

25. The article according to claim 20, the instructions when executed further causing the processing device to perform one of directly depositing the credit disbursements into an account of the customer or initiating mailing a check for the credit disbursements to the customer.

26. The article according to claim 20, the instructions when executed further causing the processing device to perform offering optional emergency reserve protection (ERP) feature to ER customers, the ERP feature providing protection that cancels any ER balance on a monthly basis during a covered event.

27. The article according to claim 26, the instructions when executed further causing the processing device to perform charging customers a period assessment for the ERP feature.

\* \* \* \* \*